Aug. 5, 1941.   G. BACH   2,251,729
CONTROL DEVICE
Filed April 27, 1937   2 Sheets-Sheet 2

Inventor:

Patented Aug. 5, 1941

2,251,729

UNITED STATES PATENT OFFICE 2,251,729

CONTROL DEVICE

Gustav Bach, Berlin-Steglitz, Germany, assignor to Askania-Werke A. G., a corporation of Germany Application April 27, 1937, Serial No. 139,330
In Germany February 1, 1935

10 Claims. (Cl. 121—41)

This invention relates to control devices. Control devices are widely used in various applications, for example for regulating physical conditions, such as pressure, temperature, humidity, or for regulating and controlling engines, for controlling the feed to machines, furnaces, for automatic steering and for various other purposes.

Generally, a control device consists of a servo-motor for actuating a control member, such as a valve, for changing or adjusting the condition to be controlled, a source of power medium for operating the servo-motor, and a relay responsive to changes in the condition to be controlled for controlling the flow of power medium for actuating the servo-motor.

Depending upon the particular purpose and the available power medium, there are electrical, pneumatic, hydraulic and other varieties of control devices.

Many control devices, expecially those responding to quick changes in the condition to be controlled, have a tendency to "hunt" or to "overshoot" the mark, as is well known in the art.

To overcome this undesirable tendency anti-hunting devices were devised known generally as "restoring devices" or "restoring connections," and based, as is well known in the art, upon the following principle. Upon an actuation of the relay, in response to changes in the condition the relay is "restored" to the normal, or inactive, position in response to the movements of the servo-motor, thereby anticipating the restoration of the normal condition and preventing an overshooting and thereby stabilizing the control device.

As will be obvious, the conventional method of stabilization requires an operative "restoring" connection between the relatively movable parts of the relay and those of the servo-motor, and also involves the use of a relatively complicated relay which must, of course, be responsive to the impulses derived from the condition and further be responsive to the servo-motor movements.

The necessary restoring connection may become a source of inconvenience and errors, especially in cases where the servo-motor is located at a point distant from the relay, since an accurate transmission of the servo-motor movement is a prerequisite for an accurate control.

It is therefore an object of this invention to prōvide a novel and stable control device having the desirable anti-hunting feature without, however, requiring a restoring connection between servo-motor and the relay and without requiring a relay of complicated construction.

According to this invention besides the relay, or master controlling member, responsive to changes in the condition, a secondary controlling member, responsive to movements of the servo-motor is provided for additionally and independently of the master means controlling the flow of the servo-motor actuating power medium.

The relay or master controlling member may therefore be placed at a point distant from the servo-motor without any disadvantages, and the stabilizing secondary controlling member of extremely simple and rugged construction may be combined with the servo-motor to form a compact unit.

Further aims, objects and advantages of this invention will appear from a consideration of the description and the accompanying drawings showing, for purely illustrative purposes, embodiments of this invention. It is to be understood that the description is not to be taken in a limiting sense, the scope of this invention being defined in the appended claims.

Referring to the drawings.

For convenient explanation of their operation the illustrated examples of control devices are shown as applied to a simple system of pressure regulation.

Pressure fluid of constant pressure is withdrawn from a storage tank 10 through a conduit 11. The supply of pressure fluid to the tank from a source (not shown) is to be controlled in response to the pressure inside the tank by means of a valve 12 inserted in the supply conduit 13.

Figure 1:
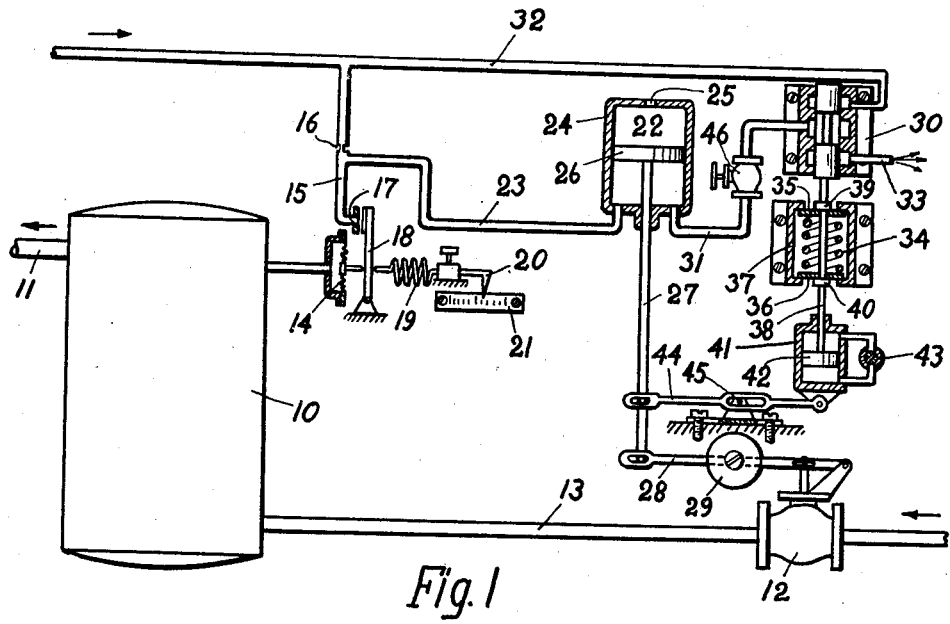
Fig. 1 is a diagrammatic illustration of a control device employing a single-acting servo-motor.

A pressure responsive device, shown as being a diaphragm 14, is acted upon by the pressure inside the tank. The diaphragm operates a relay, or master controlling device, which in Fig. 1 is shown to be of the leak-port type shown and described in the application Ser. No. 136,515 by Herbert Ziebolz, filed April 12, 1937, now Patent No. 2,223,712, dated December 3, 1940. In the illustrated form the relay comprises a conduit 15 supplied with pressure fluid from a suitable source (not shown), a constriction 16 in said conduit and a variable discharge port 17 controlled by a lever 18. An adjustable spring 19 acts upon the lever 18 in opposition to the controlling impulses applied by the diaphragm and permits an easy setting of the relay for any desired pressure value by means of a pressure indicating pointer 20 and scale 21.

Obviously, a rise in pressure inside the tank 10 will cause the lever 18 to open the port 17, thereby decreasing the impulse pressure downstream of the constriction which is now transmitted to a servo-motor 22 through a conduit 23.

The servo-motor in the illustrated example is shown to be of the single-acting reciprocating type, comprising a cylinder 24 having a vent hole 25 and a piston 26 movable in the cylinder. The piston rod 27 actuates an arm 28 of the valve 12 which is shown as biased by a weight 29.

The control device so far described will act in the following manner. Upon a rise in pressure in the tank above the normal value set at the relay 17, 18, the relay will transmit a lower impulse pressure to the servo-motor, and the piston of the latter will move downwardly under action of the weight 29, thereby moving the valve towards the closed position.

It appears that the control device will act to diminish the supply of pressure fluid through the conduit 13 after the rising pressure in the tank has passed the normal value set at the relay. The pressure will therefore attain a value, higher than desired, in other words, the control device will "overshoot."

To prevent "overshooting" a stabilizing device is provided. A secondary controlling device, shown in the illustrated example to be a three-way valve 30, is connected to be operated by the servo-motor 22 for additionally and independently of the master control means, the relay 17, 18, controlling the flow of the motor actuating power medium. For this purpose the interior of the servo-motor cylinder is connected to the valve through a conduit 31. The valve is further connected to a pressure fluid supply conduit 32 and to a discharge pipe 33 open to the atmosphere.

The secondary controlling device in the example shown in Fig. 1 is normally maintained in the neutral and closed position by a suitable resilient device shown as being a spring 34 bearing against washers 35 and 36 which are movable in a casing 37. The valve rod 38 is provided with flanges 39 and 40 engaging the washers 34 and 35. Upon an upward or downward movement of the rod 37 the spring 34 will be compressed, tending to return the valve to the normal position.

The valve is actuated over a yielding device, shown in the illustrated example to be a dash-pot, or damping cylinder, 41, with a movable piston 42 therein. The opposite cylinder chambers are by-passed by an adjustable valve 43 determining the yielding or damping factor of the device.

The dash-pot, in turn, is movable in response to servo-motor movements by means of a double armed lever 44 shown as having an adjustable pivot point 45.

The operation of the device is as follows. Upon a downward movement of the servo-motor, resulting from a rise in pressure inside the tank 10, the dash-pot 41 will be moved upwardly. It may be first assumed that the by-passing valve of the dash-pot is closed and the dash-pot acts like a rigid connection. The valve 30 will thereupon be actuated to admit pressure fluid from the supply pipe 32 to the servo-motor in opposition to the action of the master controlling device, the relay 17, 18. It is easily seen that the result will be a retarded downward motion of the servo-motor and, consequently, an increased stabilization of the control device against overshooting.

Upon a drop in pressure inside the tank 10 the relay 17, 18 will cause the servo-motor 22 to move upwardly. The upward movement causes the secondary valve 30 to open the discharge port thereby venting a certain amount of pressure fluid from the servo-motor and retarding the upward motion.

In order to conveniently adjust the amount of pressure fluid admitted or discharged by the secondary valve 30 in proportion to the amount of pressure fluid controlled by the master controlling device, a valve 46 may be provided in the conduit 31.

Assuming now that the by-pass valve 43 is not closed, but permits a relative movement of the piston 42 and the cylinder 41 the stabilizing action will be modified as follows.

Upon reception of a sudden impulse from the relay 17, 18 the servo-motor 22 will begin to move. The dash-pot will at the first moment act like a rigid connection, compress the spring 34 in one or the other direction and cause the valve 30 to retard the servo-motor movement in the hereinbefore described manner. The spring 34, however, will slowly overcome the resistance of the dash-pot and gradually decrease to zero the stabilizing or slowing-up action of the valve by moving the valve 30 into the neutral position. The time within which the stabilizing action is neutralized may easily be adjusted at the dash-pot valve 43.

The dash-pot serves also a further purpose by making the position of the secondary controlling device, the three-way valve 30, independent from the normal position of the servo-motor, or, in other words, from the position of the supply valve 12 of the illustrated example. There will therefore be no difference in the stabilizing action whether the valve 12 is near its open or closed position.

Figure 2:
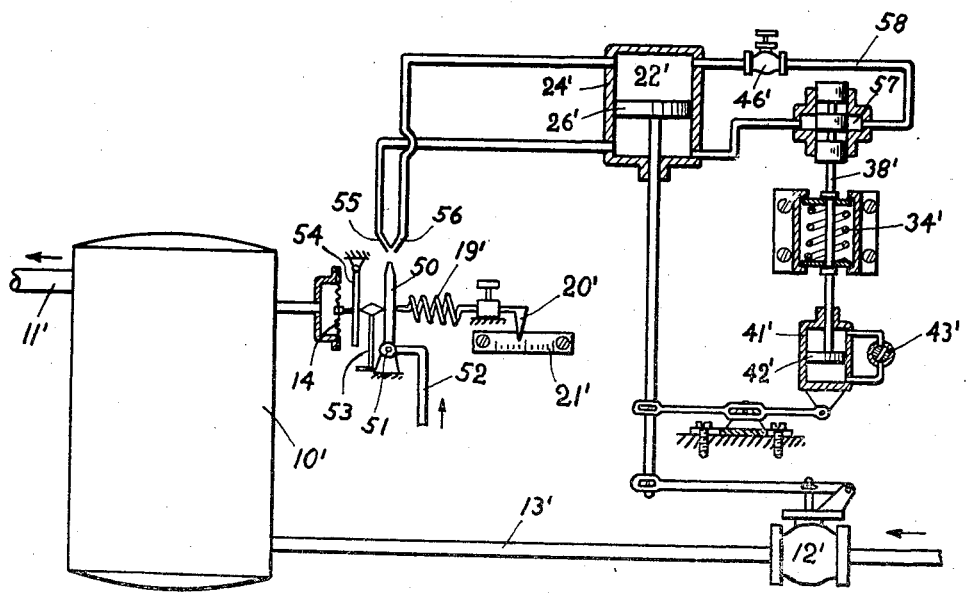
Fig. 2 shows a control device employing a double-acting servo-motor.

A modified form of control device employing a double acting servo-motor is shown in Fig. 2. The relay of this form is shown to be of the "Askania" jet-pipe type, comprising a movable jet-pipe 50 pivoted at 51 and supplied with pressure fluid from a suitable source (not shown) through a supply pipe 52. A ratio slider 53 and counterlever 54, well known in connection with jet-pipe relays, may be provided for adjusting the force of the diaphragm 14 and the counterbalancing spring 19'. The jet-pipe discharges pressure fluid into one or the other of reception orifices 55, 56 depending upon the relative position of the jet-pipe and the orifices for operating a double-acting servo-motor 22' shown in the example to be of the reciprocating type and comprising a piston 26' movable within a cylinder 24'.

For a secondary controlling device a by-passing valve 57 is shown, connected across the servo-motor 22' in a conduit 58 and operated from the servo-motor in the same way as explained in connection with Fig. 1. An adjusting valve 46' may be provided in the by-passing circuit 58.

The operation of this form of control device is as follows. Upon an upward movement of the servo-motor 22' the valve 57 will be actuated to open the by-pass conduit 58 so that the pressure fluid may pass from the upper side of the piston 26' to its lower side through the by-pass conduit 58, thereby reducing the action of the pressure fluid flow on the piston 26', i. e. thereby retarding the movement thereof. This retarding or stabilising action of the by-pass flow through the conduit 58 may be adjusted at a valve 46'. The action of the dash-pot 41', 42' and the spring 34' is identical to that explained in connection with Fig. 1. The time factor of the dash-pot is again adjustable by means of the valve 43'.

Figure 3:
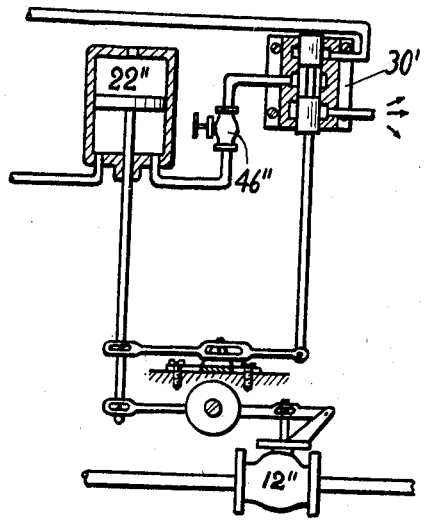
Figs. 3 and 4 show, in part, simplified forms of the control devices shown in Figs. 1 and 2.
Figure 4:
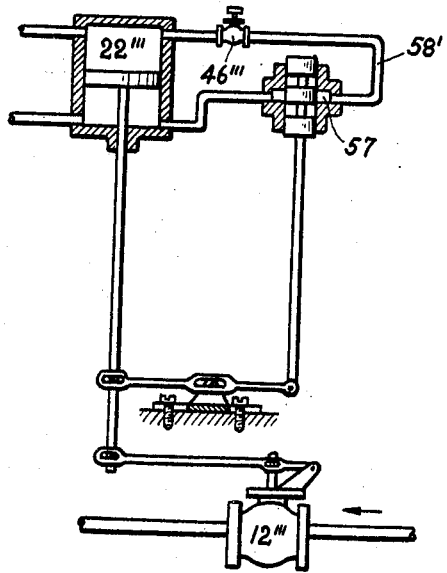

Simplified forms of control devices corresponding to Figs. 1 and 2 are shown in Figs. 3 and 4. The action of these simplified control devices is that of the devices of Figs. 1 and 2 with the dash-pot valves 43 and 43' closed.

When comparing the novel control devices with the conventional forms employing a restoring connection between the servo-motor and the relay, the devices of Figs. 1 and 2 may be considered as similar in action as control devices having a yielding restoring connection, while the forms of Figs. 3 and 4 may be compared to those having a rigid restoring connection. The main feature, however, and advance over the conventional devices employing a restoring connection resides in the elimination of the restoring connection between the relay and the servo-motor.

It may often be advantageous to delay the retarding action somewhat to make the control device quickly and fully respond to sudden changes in the condition. This feature may conveniently be attained by means of adjustable valves 130 and 157 shown in Figs. 5 and 6 in place of valves 30 and 57 of Figs. 1 to 4.

Figure 5:
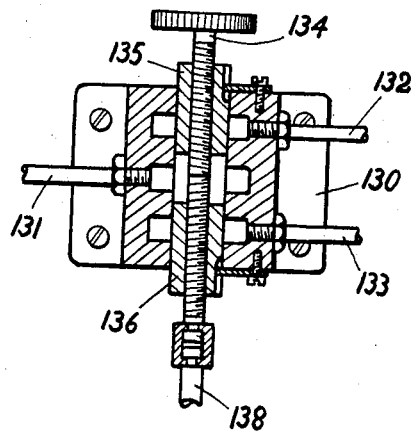
Figs. 5 and 6 show in sectional elevation suitable controlling valves for use in the control devices of Figs. 1 to 4.

In Fig. 5 the conduit leading to the servo-motor is designated 131 while the supply and discharge conduits are marked 132 and 133, respectively. A screw-threaded spindle 134 rotatably connected to a valve rod 138 permits an adjustment of valve members 135 and 136 relatively to the valve ports. It is easily seen that in the adjustment as illustrated in Fig. 5 the rod 138 may be moved a considerable distance before the discharge or supply port is opened. The retarding action will thus be delayed until the servo-motor has travelled a predetermined amount.

Figure 6:
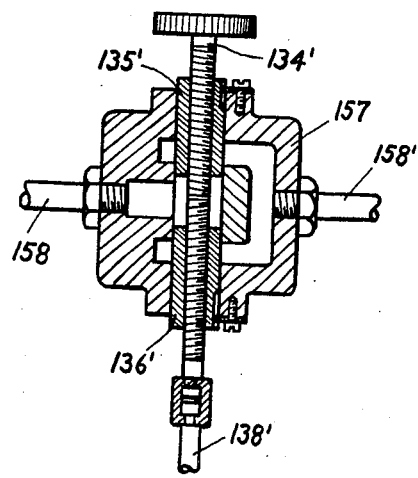

The by-passing valve 157 of Fig. 6 also includes adjustable valve members 135' and 136' for delaying the opening of the by-pass circuit 158, 158'.

Obviously the present invention is not restricted to the particular embodiments herein shown and described. Other varieties of the control devices, as for example the electrical ones, may easily be designed by substituting the equivalent elements for those disclosed in this specification. Moreover, it is not indispensable that all the features of this invention be used conjointly since they may be used advantageously in various combinations and subcombinations.

What is claimed is:

1. Control device comprising, in combination, a single-acting servo-motor; a source of pressure fluid; a relay connected to control in response to an outward impulse a flow of pressure fluid for operating said servo-motor; a dash-pot having a by-pass connection, the dash-pot being connected to be moved by said servo-motor; a three-way valve connected to be actuated by said dash-pot for venting pressure fluid from said servo-motor upon a supply to the motor from the relay, and for admitting, respectively, to said motor pressure fluid upon a venting by said relay of pressure fluid from said motor; and a spring tending to normally maintain said three-way-valve in a neutral, closed position.

2. Control device as claimed in claim 1 in which the three-way valve comprises a valve housing having ports therein; movable valve members cooperating with said ports; and means for adjustably initially setting the relative position of the valve members and the said ports as to permit a predeterminable actuating movement of the valve without opening of the ports.

3. An automatic control device comprising, in combination, a double-acting servo-motor having two working chambers; a source of power medium; a relay connected to control in response to an outward impulse a flow of power medium to one of said two working chambers for operating said servo-motor; stabilizing means, including a by-passing conduit connected to the two working chambers of said servo-motor and stabilizing value means in said by-passing conduit arranged independently of said relay and operatively connected to said servo-motor for controlling the flow through said conduit upon movements of the motor so as to reduce, independently of said relay, the action of said flow of power medium on said motor.

4. An automatic control device as claimed in claim 3, comprising yielding means for operatively connecting said servo-motor and said stabilizing value means; and resilient means connected to normally maintain said value means in the neutral closed position.

5. Control device comprising, in combination, a double-acting servo-motor having two working chambers; a source of pressure fluid; a relay connected to control in response to an outward impulse a flow of pressure fluid to one of said two working chambers for operating said servo-motor; a by-passing valve for connecting the working chambers of said servo-motor; a dash-pot having a by-pass connection, the dash-pot being connected to be moved by the servo-motor; said by-passing valve being connected to be actuated by said dash-pot and connected to by-pass the servo-motor upon movements thereof so as to reduce the action of said pressure fluid flow on said servo-motor; and a spring connected to normally maintain the by-passing valve in the closed position.

6. Control device as claimed in claim 5 in which the by-passing valve comprises a valve housing having ports therein; movable valve members cooperating with said ports; and means for adjustably initially setting the relative position of the valve members and the said ports as to permit a predetermined actuating movement of the valve without opening of the ports.

7. An automatic control device comprising in combination, a pressure fluid operated double-acting servo-motor having two pressure fluid working chambers; a source of pressure fluid; a pressure fluid relay connected to control in response to an outward impulse a master flow of pressure fluid to one or the other of said working chambers for operating said servo-motor; and stabilizing means including a controlling orifice for each of said two motor working chambers independent of said relay connections and valve means arranged independently of said relay and operatively connected to said servo-motor for controlling upon movement of said motor the outflow of fluid through said orifices so as to reduce, independently of said relay, the action of said master fluid flow on said motor.

8. An automatic control device comprising, in combination, a double-acting servo-motor; a source of power medium; a relay connected to control in response to an outward impulse a flow of power medium to the motor for operating it in the one or the other direction; and stabilizing means including an additional controlling means for each of the two sides of said motor and valve means arranged independently of said relay and operatively connected to said servo-motor for controlling, upon movement of said motor, through the controlling means, the power medium in the motor to reduce the operating effect of the power medium on the motor.

9. An automatic control device comprising, in combination, a pressure fluid operated servo-motor having a pressure fluid working chamber; a source of pressure fluid; impulse means; a relay connected to be controlled by said impulse means; a first pressure fluid conduit communicating with said servo-motor working chamber; said relay controlling a master actuating flow of pressure fluid through said conduit for actuating said servo-motor; a second pressure fluid conduit communicating with said working chamber; and stabilizing valve means arranged independently of said relay and said impulse means and operatively connected to said servo-motor for controlling, upon a movement of the servo-motor due to a master supply of pressure fluid through said first conduit into said working chamber, an additional pressure fluid flow through said second conduit in a direction to counteract said master supply flow in said working chamber and for controlling upon the opposite movement of the servo-motor due to a master discharge flow of pressure fluid through said first conduit from said working chamber an additional pressure fluid flow through said second conduit in a direction to counteract said master discharge flow from said working chamber so as to reduce, independently of said relay and said impulse means, the action of said master flow on said servo-motor for retarding the movement thereof.

10. An automatic control device comprising, in combination, a servo-motor; an element to be controlled by said servo-motor; said element being mechanically connected to said motor; a source of pressure fluid; impulse means; a relay connected to be controlled by said impulse means; a first pressure fluid conduit communicating with said servo-motor, said relay controlling a master actuating flow of pressure fluid through said first conduit for actuating said servo-motor; a second pressure fluid conduit, said first and said second conduit communicating with the same working chamber of said servo-motor; and stabilizing valve means arranged independently of said relay and said impulse means and operatively connected to said servo-motor for controlling, upon a movement of the servo-motor due to a master supply of pressure fluid through said first conduit into said working chamber, an additional pressure fluid flow through said second conduit in a direction to counteract said master supply flow in said working chamber and for controlling upon the opposite movement of the servo-motor due to a master discharge flow of pressure fluid through said first conduit from said working chamber an additional pressure fluid flow through said second conduit in a direction to counteract said master discharge flow from said working chamber so as to reduce, independently of said relay and said impulse means, the action of said master flow on said servo-motor for retarding the movement thereof.

GUSTAV BACH.